Figure 1:
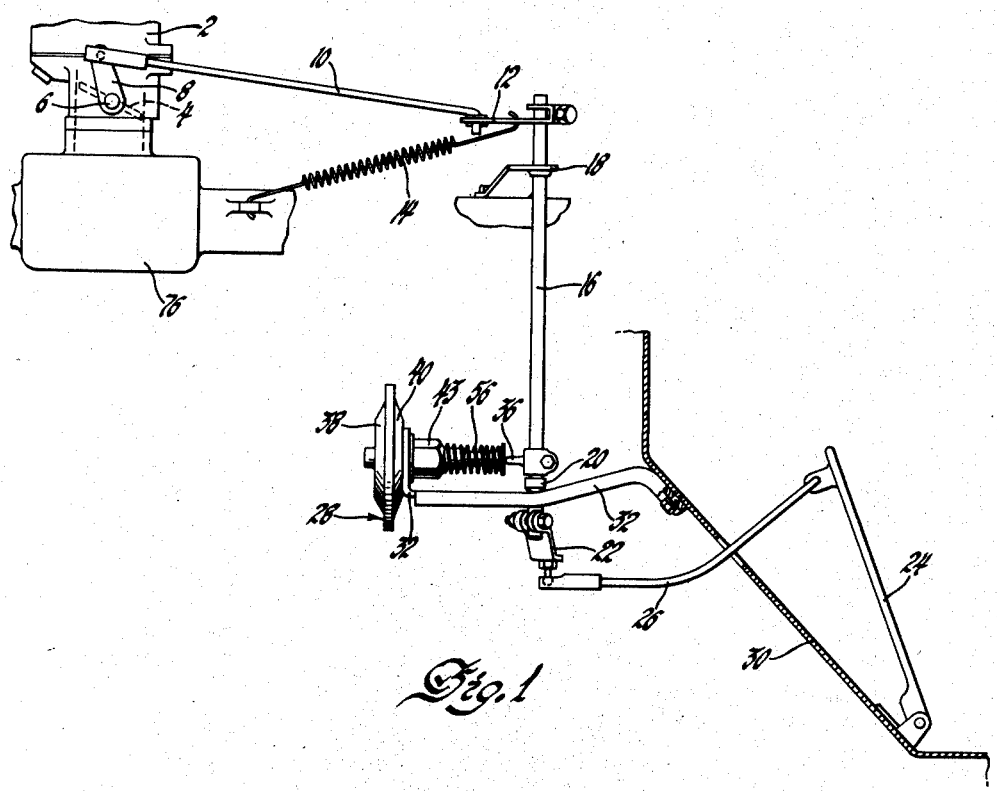

Oct. 27, 1953

J. R. EMERSON 2,657,038

ANTISTALL DEVICE

Filed Jan. 28, 1950

Inventors
John R. Emerson
By Willits, Helmig & Baillio
Attorneys

Patented Oct. 27, 1953

2,657,038

UNITED STATES PATENT OFFICE 2,657,038

ANTISTALL DEVICE

John R. Emerson, Flint, Mich., assignor to General Motors Corporation, Detroit, Mich., a corporation of Delaware Application January 28, 1950, Serial No. 141,099

2 Claims. (Cl. 267—1)

The present invention relates to means for preventing the stalling of gasoline engines and more particularly relates to means for arresting the final closing movement of an engine throttle valve to prevent said stalling.

The stalling of automobile vehicle engines has long been a problem particularly serious to drivers in traffic congested areas. During normal operation of the engine, condensed fuel collects on the inner surface of the manifold. When the throttle is suddenly closed, the pressure within the manifold decreases rapidly thus causing the almost immediate vaporization of this fuel to thereby enrich the fuel mixture. This vaporization of the fuel together with the decrease in air supply, creates an air fuel mixture which is far too rich to burn properly.

During the interval when the fuel does not burn, the engine misfires, does not produce power and may stall. The rotary inertia mass of modern automotive crankshaft and flywheel assemblies is quite low, thereby making the period through which the engine will coast very short. With the introduction of fluid flywheels and torque converters, this "coast interval" has been decreased still further due to the drag of the impeller. In torque converter transmissions, this condition is still further aggravated by the fact that little torque may be transmitted from the turbine member to the impeller member to drive the engine during overrunning conditions. Due to this low rotating inertia mass and the drag caused by the fluid coupling or torque converter, the engine is frequently unable to coast through the interval where its combustion chamber is receiving incombustible gases and for this reason stalls. This has become a serious problem especially with automotive vehicles which are driven under heavy traffic conditions.

One of the solutions of this problem is to decrease the rate of pressure change within the intake manifold so as to cause a slower vaporization of the condensed fuel and thus prevent the introduction of the extremely rich fuel mixture into the engine combustion chamber. Previous workers in the field have endeavored to decrease this rate of pressure change by the utilization of intake manifold vacuum responsive devices for controlling the final closing of the throttle valve. Such devices are quite expensive. Other prior workers in the field have utilized liquid dashpots. These liquid dashpots are fairly expensive and require modification of the carburetor if the fuel is to be used as a liquid damping agent. There are other disadvantages to liquid dashpots resulting from the necessity for sealing and using fairly close dimensional tolerances.

It is therefore an object of the present invention to produce an air dashpot for controlling the final closing rate of a vehicle engine throttle so as to prevent stalling.

It is a further object of the present invention to produce an air dashpot offering resistance to throttle movement in one direction and automatically returnable to a preset position.

It is a further object of the present invention to produce an air dashpot utilizing a spring urged diaphragm and a check valve to give unidirectional resistance to movement.

It is a further object of the present invention to produce an air dashpot having a plunger which engages a portion of the throttle valve linkage to thereby control the rate of final closure of the throttle valve.

It is a further object of the present invention to provide a closed circuit air dashpot which is free from difficulties caused by foreign matter.

Other objects of this invention will become apparent upon reading the specification and inspection of the drawing and will be particularly pointed out in the claims.

Referring to the figures in the drawing, Figure 1 is a general arrangement drawing showing a throttle valve linkage incorporating the present invention.

Figure 2:
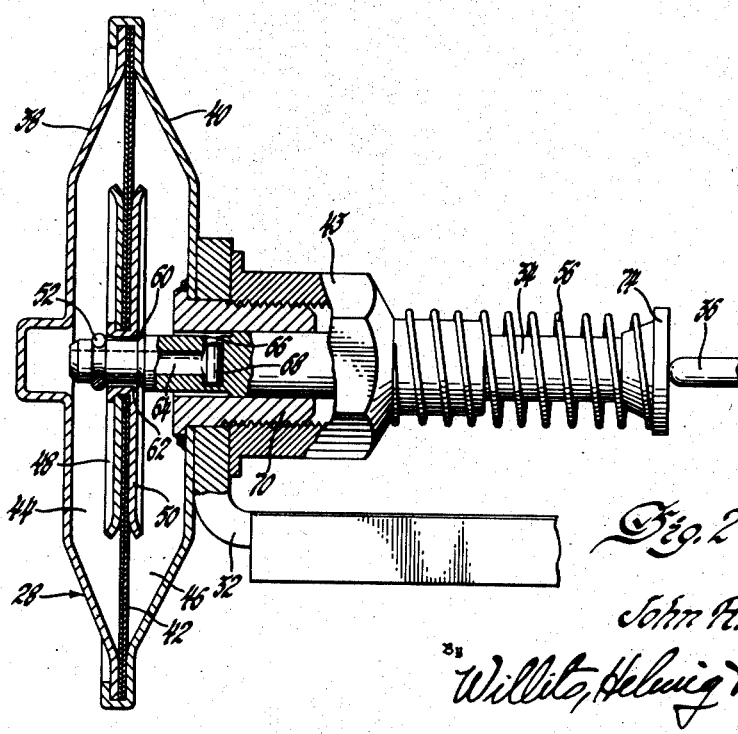

Figure 2 is a cross-sectional view of the air dashpot used in the present invention.

Referring now more particularly to Figure 1, 2 is a conventional carburetor having a throttle valve 4 rotatable with a shaft 6 by means of lever arm 8. The crank 8 is actuated by an arm 10 connected to a second crank 12. The spring 14, also connected to crank 12, urges the throttle valve to the closed position. The arm 12 is rigidly connected to the rotatable shaft 16 which is mounted to the vehicle by means of brackets 18 and 20. The shaft 16 is actuated by crank 22 which is connected to accelerator pedal 24 by means of rod 26. The depression of the accelerator pedal 24 causes the throttle closing bias exerted by spring 14 to be overcome and the throttle 4 opened. The dashpot mechanism 28 is rigidly mounted to the framework of the vehicle 30 by means of bracket 32. This dashpot has a reciprocal plunger 34 which engages an arm 36 rigidly attached to the shaft 16. The final closing movement of the throttle is thereby retarded. Means is provided for adjusting the angular position of the arm 36 on the shaft 16 so as to cause the engagement of this arm and the reciprocal plunger 34 at the proper position to give the desired dashpot action.

It may thus be seen that as the accelerator pedal 24 is released, the spring 14 urges the throttle valve 4 towards its closed position. At the proper position during closing, the arm 36 engages the dashpot plunger 34 so as to arrest the final closing of the throttle 4. This control of throttle closing rate controls the rate of pressure change in the manifold so as to prevent an incombustible mixture of fuel from being introduced into the combustion chambers of the engine.

Referring now particularly to Figure 2 in the drawing, the dashpot 28 forming part of the present invention is shown in detail. This dashpot is of the closed fluid circuit type. It will be noted from this figure that the casing members 38 and 40 are attached together at their periphery, gripping therebetween a flexible diaphragm member 42. The diaphragm divides the interior of the casing formed by 38 and 40 into two chambers the volumes of which may be varied by the axial movement of the diaphragm. The diaphragm 42 is also clamped between two circular members 48 and 50. These members have a center opening through which the plunger 34 extends. The plunger 34 has limited freedom of axial movement to permit the engagement of the surface 60 on the plunger 34 with the surface 62 on the member 50 to provide a fluid tight valve. The plunger has an axial passage 64 therein in communication with a radial passage 66. The radial passage 66 is partly blocked by pin 68 so as to restrict the flow of fluid therethrough. When the surface 60 is not engaged with the surface 62, that is, when the plunger 34 is exerting a force on the diaphragm through locking ring 52, fluid may pass freely through the annulus opening between the plunger and the member 50. The ring 52 does not completely surround the plunger 34 but allows ample space between its ends for the passage of air. The plunger 34 is secured in place by means of mating threaded member 70 and 43. The members 70 and 43 also act as a guide and a fluid seal for the plunger 34. These members also act as a means for attaching the dashopt 28 to the mounting arm 32. A coil spring 56 is interposed between the member 43 and the collar 74 on the plunger 34. This spring urges the plunger axially to the right, as shown in the drawing, so as to maintain engagement between the plunger and the member 36 throughout the range of travel of this plunger.

The plunger 34 as it moves to the right carries along with it the diaphragm clamping members 48 and 50. In this direction of movement, the valve surfaces 60 and 62 are out of engagement and air may flow freely from the chamber 46 to the chamber 44. The movement of the plunger in this direction is limited by engagement between the member 50 and the member 70. When pressure on the accelerator pedal 24 is released, the member 36 engages the plunger 34 pushing it to the left against the bias of the spring 56. In this direction of movement, the valve surfaces 60 and 62 engage each other thus preventing the passage of air from chamber 44 to chamber 46. The air therefore must flow through the axial passage 64 and restricted opening between the axial passage 66 and pin 68. In this way the rate of movement of the plunger to the left is retarded.

Operation

It is believed readily apparent from inspection of the drawing and the explanation of the device in the description above that upon depression of the accelerator pedal 24, the throttle 4 is opened against the bias of the spring and the plunger 34 under action of the spring 56 rapidly follows the movement of the arm 36 to the right. The movement of the plunger 34 to the right may be very rapid and thus follow the rapid opening of the throttle valve because the valve surfaces 60 and 62 are not in engagement and air is permitted to flow rapidly from the chamber 46 to the chamber 44 with a minimum of retarding action on the movement of the plunger. As mentioned above, this plunger will follow the movement of arm 36 until the member 50 engages the member 70. The members 34 and 36 are therefore not in engagement under normal throttle opening. Upon release of the accelerator pedal 24, the spring 14 rapidly closes the throttle 4 until the member 36 engages the plunger 34. At this point the force exerted by the spring 14 overcomes the force exerted by the spring 56 and starts movement of the plunger 34 to the left. This movement is retarded and its rate of return limited by the rate of fluid transfer from the chamber 44 to the chamber 46 through the restricted opening between the passage 66 and the pin 68. In this way the final closing movement of the throttle is retarded and its rate of closure so limited that the rate of pressure decrease within the manifold 76 is not sufficiently high to cause the formation of an unburnably rich fuel mixture by the sudden vaporization of condensed fuel on the inner surfaces of this manifold. By thus retarding the final closing rate of the throttle valve, misfiring of the engine is prevented and it does not have a sufficiently long interval of no power production to permit stalling. It may thus be seen that this invention prevents the stalling of a vehicle due to the causes mentioned above.

It is to be understood also that although the invention has been described with specific reference to a particular embodiment thereof, it is not to be so limited, since changes and alterations therein may be made which are within the full intended scope of this invention as defined by the appended claims.

I claim:

1. A closed circuit fluid dashpot including: a fluid tight casing, a flexible diaphragm dividing the interior of said casing into two separate chambers, a spindle member extending through said casing and capable of transmititng force to said diaphragm in both directions of axial movement, a spring between the spindle member and said casing at all times biasing said spindle in one direction of movement, said spindle having an opening therein capable of allowing the limited flow of fluid from one of said chambers to the other, a lost motion connection between said diaphragm and said spindle, a valve element on said spindle capable of being operated by said lost motion to a position away from said diaphragm to allow the passage of fluid from one of said chambers to the other when said spindle is moved under the bias of said spring and capable of being closed against said diaphragm by said lost motion when said spindle is moved against the bias of said spring to thereby provide a fluid dashpot mechanism offering resistance to movement of the spindle in one axial direction of movement and capable of freely returning said spindle to a predetermined position in the other axial direction of movement under the bias of said spring.

2. A closed circuit fluid dashpot including: a fluid tight casing, a flexible diaphragm dividing the interior of said casing into two chambers, a spindle member extending into said casing and capable of transmitting force in an axial direction to said diaphragm, said spindle and diaphragm having limited radial and limited axial movement therebetween, means providing restricted fluid flow between said chambers in all positions of said spindle and diaphragm, and a valve means between said diaphragm and spindle, said valve means having two positions, in one of which fluid may flow freely from one chamber to the other, and in the other of which said fluid flow is cut off, and means biasing said valve means to said one position.

JOHN R. EMERSON.

References Cited in the file of this patent

UNITED STATES PATENTS

| Number | Name | Date |
|---|---|---|
| 1,054,435 | McDonald | Feb. 25, 1913 |
| 1,198,829 | Edwards | Sept. 19, 1916 |
| 1,427,764 | Steubing et al. | Aug. 29, 1922 |
| 1,992,555 | Templin | Feb. 26, 1935 |
| 2,061,170 | Post | Nov. 17, 1936 |
| 2,306,877 | Gould | Dec. 29, 1942 |
| 2,387,066 | Harding | Oct. 16, 1945 |

FOREIGN PATENTS

| Number | Country | Date |
|---|---|---|
| 218,650 | Great Britain | Nov. 20, 1924 |